United States Patent
Liu et al.

(10) Patent No.: US 9,197,056 B2
(45) Date of Patent: Nov. 24, 2015

(54) SOLID STATE POWER CONTROL SYSTEM FOR AIRCRAFT HIGH VOLTAGE DC POWER DISTRIBUTION

(75) Inventors: Zhenning Liu, Mississauga (CA); Randy Fuller, Hillsburgh (CA); Wayne Pearson, Oro Valley, AZ (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 742 days.

(21) Appl. No.: 13/493,558

(22) Filed: Jun. 11, 2012

(65) Prior Publication Data

US 2013/0329329 A1     Dec. 12, 2013

(51) Int. Cl.
*H02H 3/087* (2006.01)
*H02H 9/02* (2006.01)
*H02H 3/18* (2006.01)

(52) U.S. Cl.
CPC ............. *H02H 3/087* (2013.01); *H02H 3/18* (2013.01); *H02H 9/02* (2013.01)

(58) Field of Classification Search
CPC ................................. H02H 9/02; B60L 1/00
See application file for complete search history.

(56) References Cited

U.S. PATENT DOCUMENTS

| | | | |
|---|---|---|---|
| 5,455,731 A | 10/1995 | Parkinson | |
| 6,331,763 B1* | 12/2001 | Thomas et al. | 320/136 |
| 7,586,725 B2 | 9/2009 | DiVito et al. | |
| 7,626,798 B2* | 12/2009 | Rusan et al. | 361/93.6 |
| 7,656,634 B2 | 2/2010 | Robertson et al. | |
| 7,741,883 B2 | 6/2010 | Fuller et al. | |
| 8,059,378 B2 | 11/2011 | Liu et al. | |
| 8,344,544 B2* | 1/2013 | Rozman et al. | 307/44 |
| 8,612,027 B2* | 12/2013 | Carrillo | 700/22 |
| 8,829,826 B2* | 9/2014 | Rozman et al. | 318/376 |
| 2011/0222200 A1 | 9/2011 | Fuller et al. | |
| 2011/0285202 A1 | 11/2011 | Rozman et al. | |

(Continued)

FOREIGN PATENT DOCUMENTS

| | | |
|---|---|---|
| CN | 201974456 | 9/2011 |
| CN | 201975766 | 9/2011 |

OTHER PUBLICATIONS

Design specification of a 270 V 100 A solid-state power controller suitable for aerospace applications, BAhmed, M.M.R.; Mawby, P.A, University of Warwick, Coventry, CV4 7AL, United Kingdom, 2009 13th European Conference on Power Electronics and Applications, EPE '09, 2009, 2009 13th European Conference on Power Electronics and Applications, EPE '09.

(Continued)

*Primary Examiner* — Zeev V Kitov
(74) *Attorney, Agent, or Firm* — Shimokaji IP (57) ABSTRACT

An electrical power distribution system (EPDS) for an aircraft, the EPDS may include a DC bus, a power source port, a solid state power controller (SSPC) of a first type interposed between the power source port and the DC bus, at least one load port and an SSPC of a second type interposed between the load port and the DC bus. Power input to the SSPC of the first type may be connected to a unidirectional solid state switching device (SSSD) of the SSPC of the first type. The SSPC of the first type may have forward and reverse current conducting capability and forward and reverse current blocking capability. Power input to the SSPC of the second type may be connected to a unidirectional SSSD of the SSPC of the second type. The SSPC of the second type may have forward and reverse current conducting capability and capability of blocking current from only one direction.

18 Claims, 8 Drawing Sheets

(56) References Cited

U.S. PATENT DOCUMENTS

| 2011/0286141 | A1 | 11/2011 | Rozman et al. |
| 2011/0299201 | A1 | 12/2011 | Rozman et al. |
| 2011/0309809 | A1 | 12/2011 | Rao et al. |
| 2012/0007425 | A1 | 1/2012 | Rozman et al. |
| 2012/0091789 | A1 | 4/2012 | Gil et al. |

OTHER PUBLICATIONS

Implementation of high voltage DC solid state power controller, Wang, Li; Yang, Shanshui; Yan, Yangguang, College of Automation Engineering, Nanjing University of Aeronautics and Astronautics, Nanjing 210016, Jiangsu, China, NGCWP 2007—Proceedings of 2007 Non-Grid-Connected Wind Power Systems—Wind Power Shanghai 2007—Symposium on Non-Grid-Connected Wind Power, p. 108-113, 2007, NGCWP 2007—Proceedings of 2007 Non-Grid-Connected Wind Power Systems—Wind Power Shanghai 2007—Symposium on Non-Grid-Connected Wind Power.

A novel high current solid state power controller, Liu, Wei; Huang, Alex Q., College of Automation Engineering, Nanjing University of Aeronautics and Astronautics, Nanjing 210016, Jiangsu, China, Semiconductor Power Electronics Center, Department of Electrical and Computer Engineering, North Carolina State University, Raleigh, NC, United States.

High current and thermal transient design of a SIC SSPC for aircraft application, Guo, Yuan-Bo; Bhat, Krishna; Aravamudhan, Arunkumar; Hopkins, Douglas; Hazelmyer, Donald R.

University at Buffalo (State University of New York at Buffalo), United States DensePower, LLC, United States, Conference Proceedings—IEEE Applied Power Electronics Conference and Exposition—APEC, p. 1290-1297, 2011, 2011 26th Annual IEEE Applied Power Electronics Conference and Exposition, APEC 2011.

SIC based solid state power controller, Feng, Xiaohu; Radun, Arthur V., Anderson Hall, University of Kentucky, Lexingto, Conference Proceedings—IEEE Applied Power Electronics Conference and Exposition—APEC, p. 1855-1860, 2008, 2008 23rd Annual IEEE Applied Power Electronics Conference and Exposition, APEC.

SSPC model with variable reset time, environmental temperature compenstaion and thermal memory effect, Barrado, A; Izquierdo, D; Raga, C; Lázaro, A; Sanz, M., Electronic Technology Department, Pow er Electronic System Group (GSEP), Avda, Universidad, 30, 28911, Leganè, Madrid, Spain Electrical Department, General System Engineer EADS-CASA (MAS) John Lennon, 28907, Getafe, Madrid, Spain, Conference Proceedings—IEEE Applied Power ElectronicsConference and Exposition—APEC, p. 1716-1721, 2008, 2008 23rd Annual IEEE Applied Power Electronics Conference and Exposition, APEC.

Solid-state power controllers meet system demands, Friedman, Steven N., ILC Data Device Corp, United States, SAE Technical Paper Series, p. 1-13, 1992.

Improving connection and disconnection of a small scale distributed genterator using solid-state controller, Ahmed, M.M.R., Warw ick University, Electrical Department, Coventry, United Kingdom, 2008 13th International Power Electronics and Motion Control Conference, EPE-PEMC 2008, p. 1866-1871, 2008, 2008 13th International Power Electronics and Motion Control Conference, EPE-PEMC 2008.

Controllers guard against arc faults, Mussmacher, Kevin1; Froeb, William L., Business Development, National Hybrid Inc., Ronkonkoma, NY 2 Pow er Products, National Hybrid Inc., Ronkonkoma, Power Electronics Technology, v 30, n 11, p. 36-44, Nov. 2004.

\* cited by examiner

SOLID STATE POWER CONTROL SYSTEM FOR AIRCRAFT HIGH VOLTAGE DC POWER DISTRIBUTION

BACKGROUND OF THE INVENTION

The present invention generally relates to aircraft electrical power distribution systems (EPDS) and more particularly to such systems which employ solid state power controllers (SSPC) for power routing and protection against damage from electrical fault conditions.

SSPC technology is gaining acceptance as a modern alternative to the traditional electromechanical contactors and circuit breakers, due to its high reliability, fast response time, and ability to facilitate advanced load management and other aircraft functions. A typical SSPC comprises a solid state switching device (SSSD) which performs fundamental power on/off switching and a SSPC processing engine which is responsible for SSSD on/off control and feeder wire protection. While SSPCs with current rating less than 20 A have been widely used in aircraft secondary distribution systems, replacing thermal circuit breakers, their application for aircraft high voltage DC (HVDC) power distribution systems has issues and challenges.

Unlike direct metal contacts in a traditional electromechanical contactor or relay, an SSSD for higher voltage and current applications has more significant voltage drop in the "on" state. This voltage drop leads to undesirable power dissipation across the SSSD, which presents significant challenges in the thermal design of SSSD packaging and may adversely impact the life, size and weight of an entire power distribution system.

An aircraft electric power distribution system (EPDS) is often required not only to survive, without any physical damage, when lightning strikes the aircraft, but also to maintain operation during and after the strike. This poses a significant challenge to the design of SSPC based EPDS, since SSPCs often contain electronic circuitry which could be damaged or upset by the excessive transient voltages induced resulting in undesirable (or nuisance) trips due to lightning strikes. Increasing use of composite materials in aircraft fuselage exacerbates the situation.

When a DC SSPC is turned on to a large capacitive load, the peak inrush current can be very high. This is particularly true for SSPCs used in a high voltage DC primary power distribution system, where large energy storage components are connected to the DC power bus, and when multiple downstream SSPC channels are turned on simultaneously during power-up process. Excessive high inrush current could result in stress in electrical components during power-up, therefore reducing their operational life, potential electric hazards, and EMI issues.

Leakage current associated with HVDC SSPCs and the "failclosed" nature of SSSD are critical concerns for the safety of SSPC applications. When an SSPC channel is in an "open" state, maintenance personnel may come into contact with an open end of a power channel and get startled due to possible excessive leakage current. This potential safety risk may arise during maintenance activities such as replacing an aircraft load that is connected to the SSPC channel with the excessive leakage. Additionally, an inherent "failclosed" nature of the SSSD can be a safety concern. This concern has become a critical element for the certification of the SSPC technology for commercial aircraft and thus, a secondary means of protection is usually required.

As can be seen, there is a need for an aircraft EPDS which employs SSPCs for control and fault protection wherein vulnerabilities of the SSPCs are mitigated. In particular there is a need for an SPPC-based EPDS with minimal voltage drops, minimal risk of safety issues from leakage currents, minimal risk of nuisance trips from lightning strikes and minimal risk of damage from high inrush currents.

SUMMARY OF THE INVENTION

In one aspect of the present invention, an electrical power distribution system (EPDS) for an aircraft, the EPDS may comprise: a DC bus; a power source port; a solid state power controller (SSPC) of a first type interposed between the power source port and the DC bus; at least one load port; an SSPC of a second type interposed between the load port and the DC bus; wherein power input to the SSPC of the first type is connected to a unidirectional solid state switching device (SSSD) of the SSPC of the first type and the SSPC of the first type has forward and reverse current conducting capability and forward and reverse current blocking capability; and wherein power input to the SSPC of the second type is connected to a unidirectional SSSD of the SSPC of the second type and the SSPC of the second type has forward and reverse current conducting capability and capability of blocking current from only one direction.

In another aspect of the present invention, a bus tie control system for an aircraft may comprise: a first SSPC interposed between a first DC bus and a bus tie; a second SSPC interposed between a second DC bus and the bus tie; the first SSPC having a first unidirectional SSSD oriented to block current in a first direction; the second SSPC having a second unidirectional SSSD oriented to block current is a second direction opposite to the first direction; and the first SSPC and the second SSPC each include clamps interposed between a ground connection and the bus tie.

In still another aspect of the present invention, a method for distributing DC power on an aircraft may comprise the steps of transferring power from a main DC power source to a DC bus through a solid state power controller (SSPC) of a first type; transferring power from the DC bus to a DC load through an SSPC of a second type; blocking current in a first direction through the SSPC of the first type in the event of an overcurrent condition in a current path of the SSPC of the first type through operation of a unidirectional SSSD of the SSPC of the first type; blocking current in a reverse direction, opposite the first direction, through the SSPC of the first type in the event of the overcurrent condition in the current path of the SSPC of the first type by opening an electromechanical contactor connected in series with the unidirectional SSSD of the SSPC of the first type; blocking current in through the SSPC of the second type in the event of an overcurrent condition in a current path of the SSPC of the second type through operation of a unidirectional SSSD of the SSPC of the second type; and closing a clamping switch to produce a connection between ground and an output side of the unidirectional SSSD of the SSPC of the second type whenever the SSPC of the second type is in a current blocking state.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides a high voltage DC (HVDC) electrical power distribution system (EPDS) for an aircraft in which various types of solid state power controllers (SSPC) are employed to control routing of power and provide protection against damage from electrical faults. A particular one of the types of SSPC's may be selected to perform particular functions in a manner that optimizes the performance capability of the selected type of SSPC.

Figure 1:
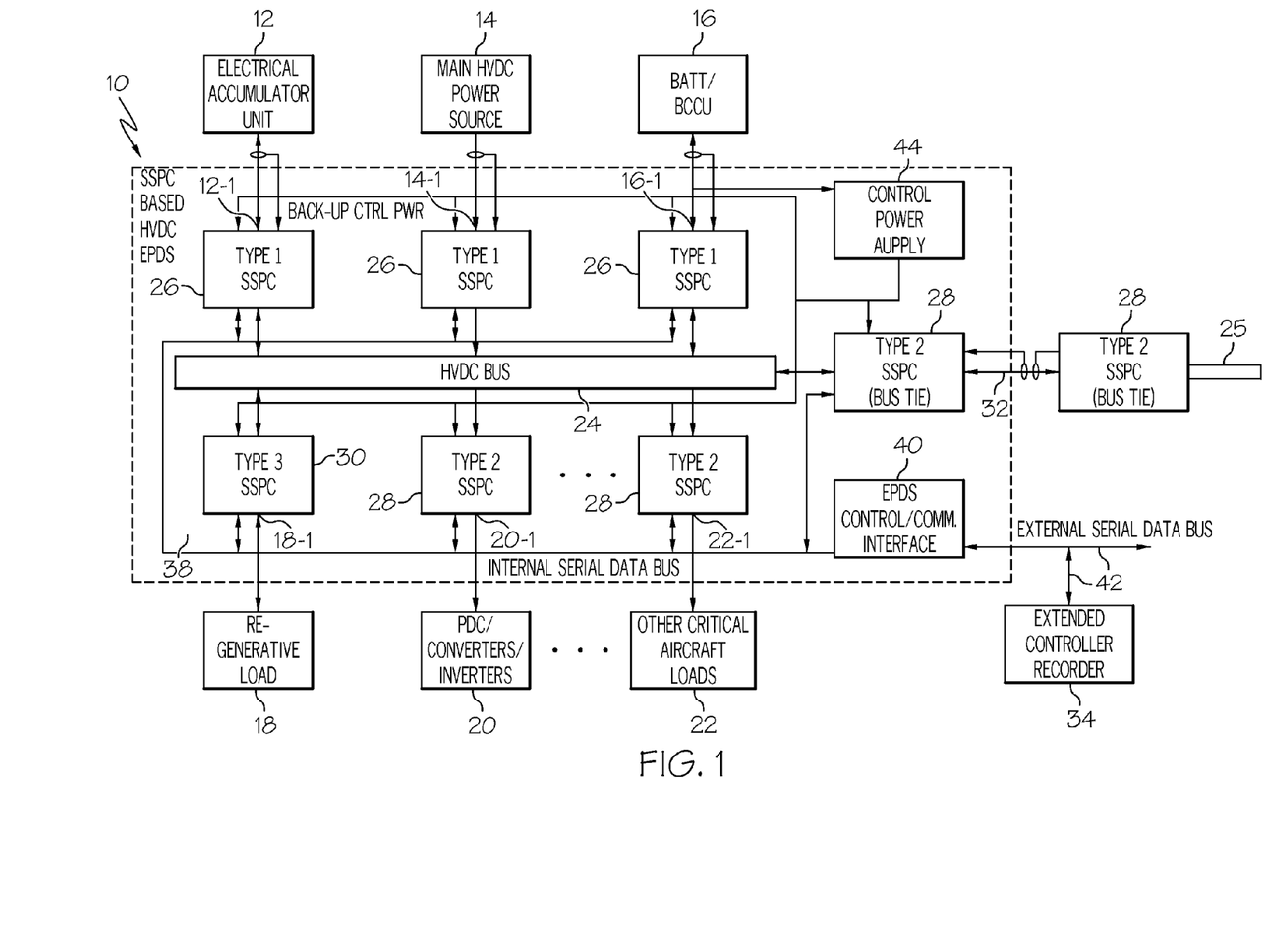
FIG. 1 is a schematic block diagram of an aircraft electrical power distribution system (EPDS) in accordance with an embodiment of the invention.

Referring now to FIG. 1, a HVDC EPDS for an aircraft is designated generally by the numeral 10. The EPDS 10 may be configured and operated to control flow of power between and among various power sources and loads of an aircraft. For example, power sources may include a main HVDC power source 12, an electrical accumulator unit 14 and a battery and its associated battery charge control unit (BATT/BCCU) 16. Loads that may be connected with the EPDS 10 may include, for example, regenerative loads 18, converters and inverter loads 20 and other critical loads 22. The power sources 12, 14 and 16 may be interconnected with the EPDS 10 through power source ports 12-1, 14-1 and 16-1 respectively. The loads 18, 20 and 22 may be interconnected with the EPDS 10 through load ports 18-1, 20-1 and 22-1 respectively.

The EPDS 10 may include a HVDC bus 24 and SSPCs of various types may be interposed between the bus 24 and the ports 12-1, 14-1, 16-1, 18-1, 20-1 and 22-1. In an exemplary embodiment of the EPDS 10, SSPCs 26 of a first type (hereinafter type 1 SSPC 26) may be interposed between the bus 24 and the power source ports 12-1, 14-1 and 16-1. SSPCs 28 of a second type (hereinafter type 2 SSPC 28) may be interposed between the bus 24 and the load ports 20-1 and 22-1 and a bus tie 32. SSPC 30 of a third type (hereinafter type 3 SSPC 30) may be interposed between the bus 24 and the load port 18-1.

It may be seen that each of the power sources 12, 14 and 16 may be controlled by a dedicated one of the type 1 SSPCs 26. Reverse current conducting capability for the type 1 SSPCs may be required for battery charging in the power source 16 and energy supply to the electrical accumulator unit 12. Reverse current blocking capability, when the type 1 SSPCs 26 are in their "off" state is also required for fault isolation.

Type 2 SSPCs 28 modules may be used to provide feeder controls for the loads 20 and 22. Type 2 SSPCs 28 may be designed to be capable of blocking current flow from only one direction, but allowing the current flow from the opposite direction, regardless of the "on/off" state of the SSPC 28. This power blocking characteristic may facilitate the needs of DC power distribution as well as power recovery from regenerative loads, if the blocking control of power recovery from a regenerative load is not required. Through proper orientation and coordinated control (as described hereinbelow), Type 2 SSPCs 28 may also be used for control of a bus tie 32 connecting the bus 24 with a second bus 25 external to the EPDS 10.

A type 3 SSPC 30 may be used for re-generative loads, such as electric actuators, where current blocking capability in both directions (i.e. a bidirectional switch) is required.

An external control unit 34 may communicate with the EPDS 10 to set each SSPC's current rating and "on/off" states as required to achieve a desired system configuration for a particular aircraft. The control unit 34 may communicate with the EPDS 10 via a control and communication card 40, which in turn may communicate with all the SSPCs 26, 28 and 30, through internal serial data buses 38. During fault conditions the SSPCs 26, 28 and/or 30 may detect and react to faults. Detected faults and actions taken may be reported to control unit 34. The EPDS 10 may perform sensing and processing of external current signals to facilitate differential current protection of critical zones, as well as $I^2t$ and arc fault protection mechanisms embedded within the respective SSPCs.

The main functions of the control and communication card 40 may be to provide standard communication interfaces to facilitate bus power controls from the external control unit 34 through an external serial data bus 42, and to perform necessary information exchanges for load management. In addition, the card 40 may also provide necessary system monitoring and fault detection/isolation for the entire EPDS 10, and may facilitate data traffic between the EPDS 10 and the external control unit 34.

Each of the SSPCs 26, 28 and 30 may convert its own required isolated control power directly from the input power it is controlling. However, a redundant (or back-up) control power source 44 may also be utilized to provide for potential need to drive and hold a simple and de-rated electromechanical contactor for type 1 SSPCs 26 (to be described hereinbelow) and to power the control and communication card 40.

Figure 2:
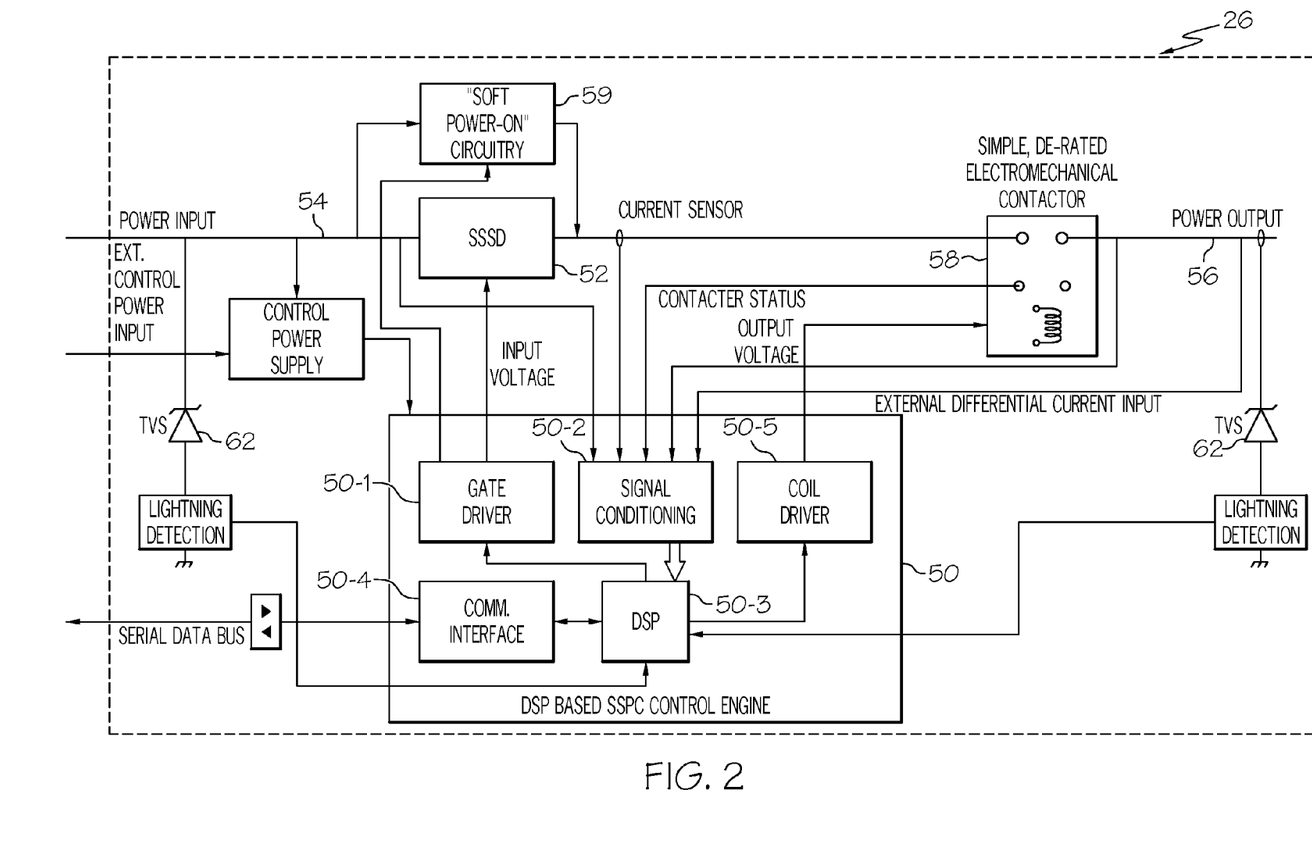
FIG. 2 is a schematic block diagram of a first type of solid state power controller (SSPC) of the EPDS of FIG. 1 in accordance with an embodiment of the invention.
Figure 3:
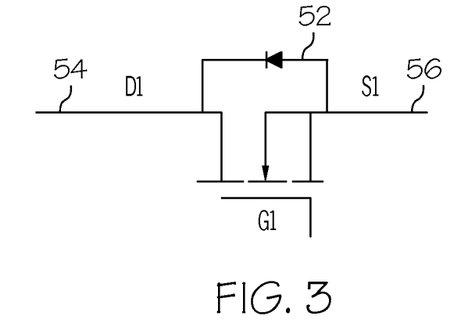
FIG. 3 is a schematic diagram of a solid state switching device (SSSD) of the SSPC of FIG. 2 in accordance with an embodiment of the invention.

Referring now to FIG. 2, one of the type 1 SSPCs 26 is illustrated in detail. In some respects the type 1 SSPC 26 may include structural and operational features which are described in US Patent Application Publication 2011/0222200 dated Sep. 15, 2011, which publication is incorporated herein by reference. The type 1 SSPC may include a control engine 50 which may comprise a gate driver 50-1, a signal conditioner 50-1, a digital signal processor (DSP) 50-3 a communications interface 50-4 and a coil driver 50-5. A unidirectional solid state switching device (SSSD) 52 may be interposed between a power input 54 and a power output 56. The SSSD 52 may comprise a metal oxide field effect transistor (MOSFET) configured as shown in FIG. 3.

An electromechanical contactor 58 may be interposed between the SSSD 52 and the power output 56 in series with the SSSD 52. Reverse blocking capability of the SSSD 52 may be achieved through opening of the electromechanical contactor 58 even though the SSSD 52 is a unidirectional switch. The significance of this capability may be evident when comparing the differences in resulting SSSD on-resistance of a single unidirectional switch as compared to four MOSFETS that may be otherwise needed to achieve bidirectional current blocking capability. A four to one reduction in power dissipation and associated thermal management requirement may result in desirable improvements in cost, weight, and reliability of the type 1 SSPC 26.

By commanding the contactor 58 in an open state, galvanic isolation can be achieved when the SSPC 26 is at the "off state", so that the leakage current issue associated with the SSSD 26 can be resolved. Moreover the contactor 58 may serve as a secondary means of fault isolation if the SSSD 26 fails short, thus making the type 1 SSPC 26 suitable for primary distribution applications. Additionally, it may be noted that the design of the type 1 SSPC 26 may allow use of "normally on" semiconductor devices as the main power switching device for the SSPC 26.

During steady state operation, the contactor 58 may remain in the "closed state" as long as the SSSD 52 is in the "on" state. The contactor 58 may provide galvanic isolation by staying in the "open state" when the SSSD 52 is in the "off" state. There may be no current break-up (except the leakage current in mA or less) involved during normal contactor open/close transitions as a result of coordinated control between the SSSD 52 and the contactor 58. Consequently the SSSD 52 may always handle main current switching. Thus, contactor 58 may be designed (or selected) to be a relatively simple device which does not need to handle arcs. In other words, the contactor 58 may only be required to be capable of successfully breaking up a predetermined fault current only infrequently, i.e., in case the SSSD 52 fails short, or the SSPC 26 detects an over current situation in the reverse direction.

An auxiliary contact output associated with the contactor can be used by the control engine 50 to determine the open/close status of the contactor 50. Status of the contactor 58 may also be derived from the input/output current/voltage sensing signals, which further simplifies the structure of the contactor 58.

Figure 4:
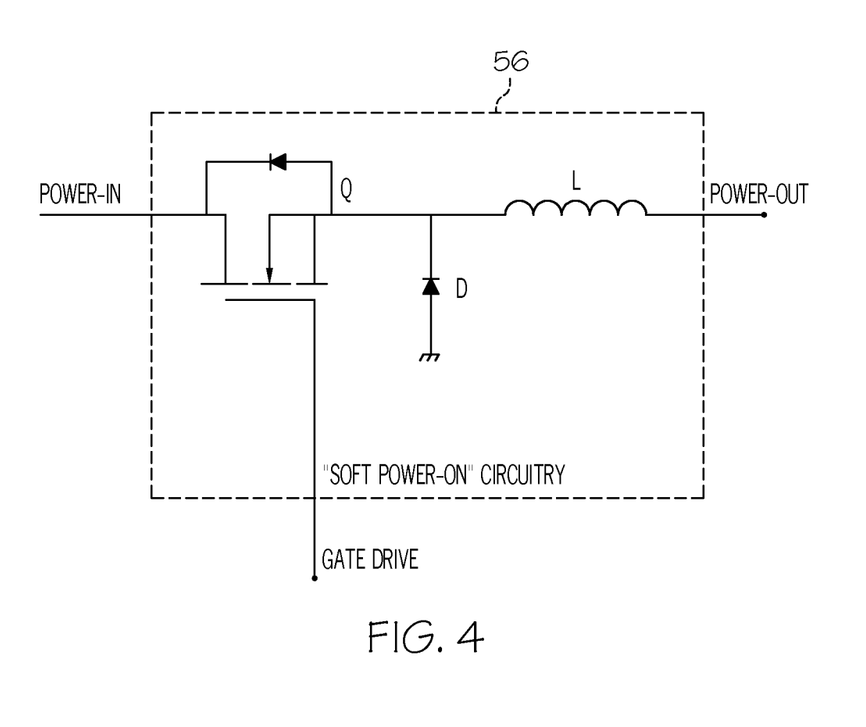
FIG. 4 is a schematic diagram of a soft turn-on circuit of the SSPC of FIG. 2 in accordance with an embodiment of the invention.

The type 1 SSPC 26 may be provided with soft power-on circuitry 59 in a configuration shown in FIG. 4 and as described in US Patent Application Publication 2011/0309809 dated Dec. 22, 2011, which publication is incorporated herein by reference. Additionally, the type 1 SSPC 26 may be provided with lightning protection. When excessive lightning induced surge voltage strikes an SSPC channel from either the power input 54 or the load output 56, a transient voltage sensor (TVS) 62 may be forced into the break-down state, diverting significant amount of surge current through the TVS 62. More importantly, this surge current may be used as an effective and reliable indication (or identification) of the presence of lightning, thus allowing for lightning detection and corresponding reaction to such events thus avoiding nuisance trips. One example of such a lightning immunity system is described in U.S. Pat. No. 8,059,378 dated Nov. 15, 2011, which publication is incorporated herein by reference.

Figure 5:
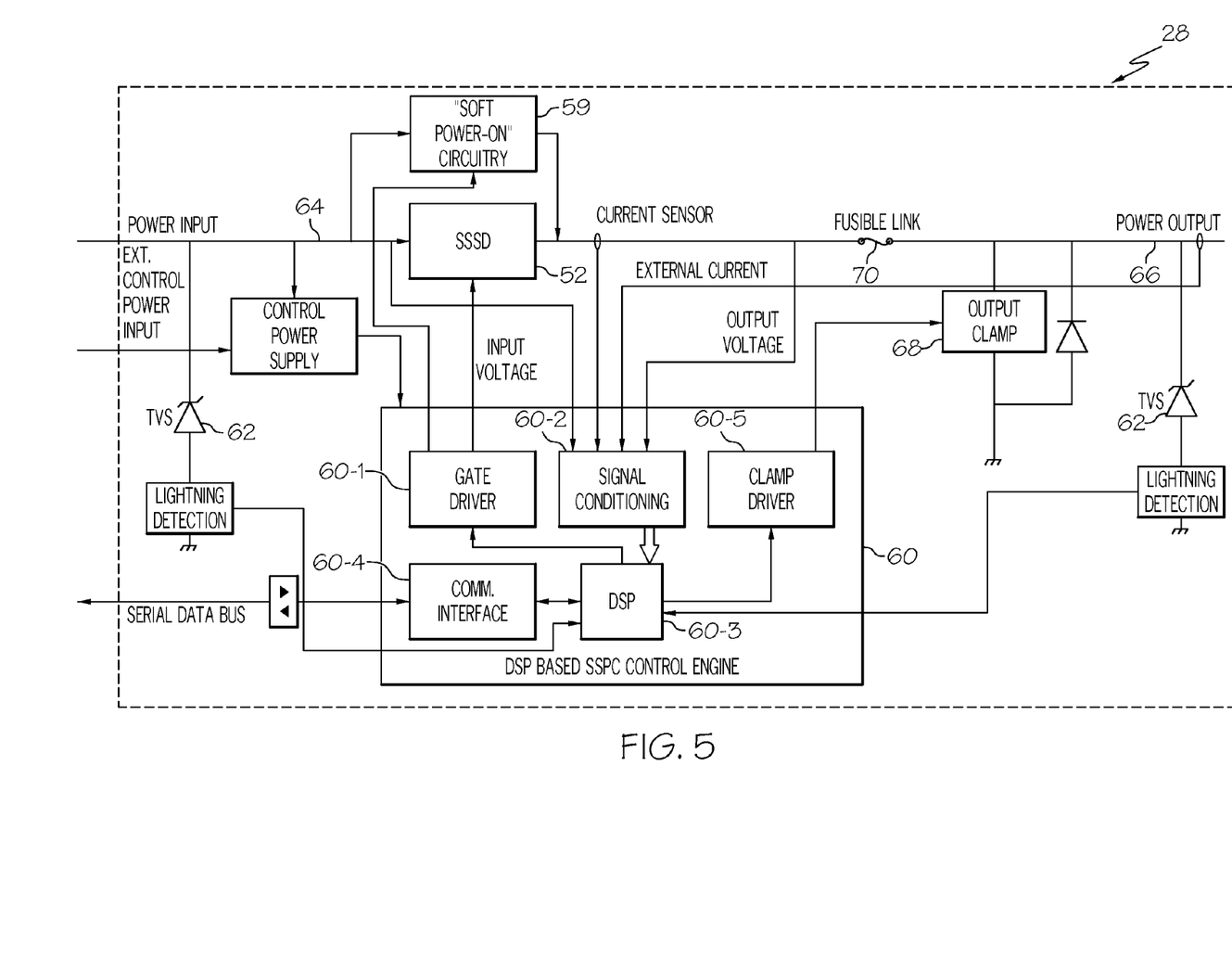
FIG. 5 is a schematic block diagram of a second type of solid state power controller (SSPC) of the EPDS of FIG. 1 in accordance with an embodiment of the invention.

Referring now to FIG. 5, one of the type 2 SSPCs 28 is illustrated in detail. In some respects the type 2 SSPC 28 may include structural and operational features which are described in U.S. Pat. No. 7,586,725 dated Sep. 8, 2009, which publication is incorporated herein by reference. The type 2 SSPC may include a control engine 50 which may comprise a gate driver 60-1, a signal conditioner 60-2, a DSP 60-3 a communications interface 60-4 and a clamp driver 60-5. One of the unidirectional SSSD 52 may be interposed between a power input 64 and a power output 66. The SSSD 52 may comprise a MOSFET configured as shown in FIG. 3.

Figure 6:
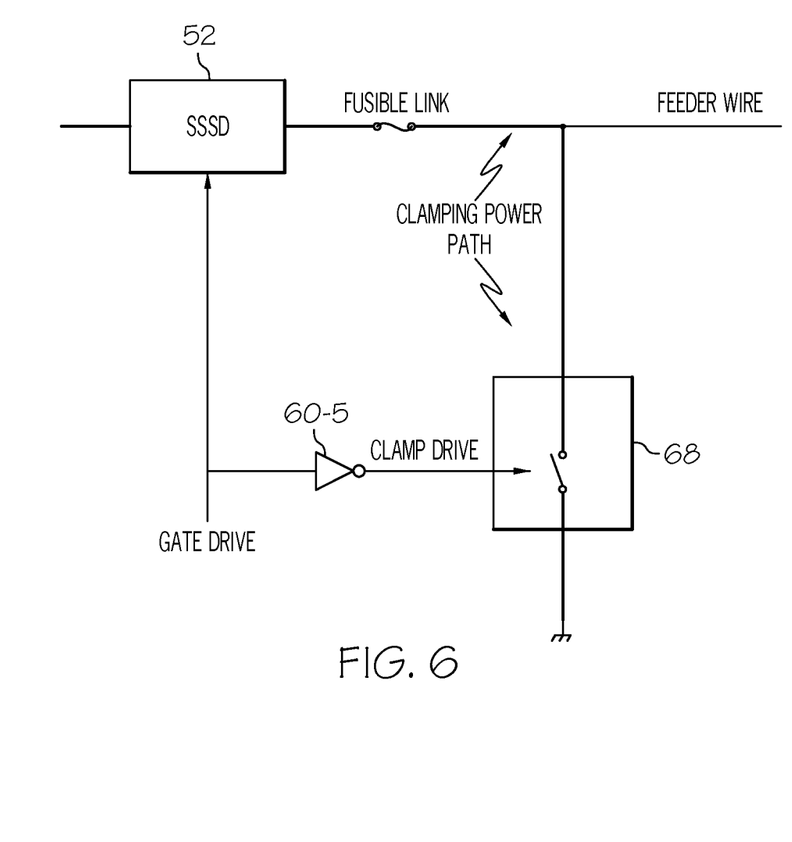
FIG. 6 is schematic diagram of a clamp of the SSPC of FIG. 5 in accordance with an embodiment of the invention.

An output clamp 68 may be connected to the output side 66. The output clamp may be configured as shown in FIG. 6. Control of the SSPC 28 may coordinated with the gate driver 60-1 such that the clamp 68 shall always be in the open state before the SSSD 52 is turned-on, and the clamp 68 shall always be in the closed state after the SSSD 52 is turned-off. This way, whenever the SSPC 28 is in the "off" state, the voltage at the output of the SSPC 28, due to leakage current, will be kept below a threshold level because the clamp 68 may drain leakage current to ground.

If a simple electromechanical relay is used as the clamp 68, it may provide an effective way of addressing the SSPC fail-shorted issue. In case the SSSD 52 fails short and the associated load needs to be switched off due to either a turn-off command or an over current fault, the clamp 68 may be immediately closed, forming a short circuit path to the power output 64, and further forcing a fusible link 70 in the short circuit path to open up. During this process, an associated output feeder wire is protected. As a result, the fusible link 70 used as the secondary protection for the SSPC channel may no longer need to be sized for the feeder wire rating, although the fuse cannot be under rated. This may eliminate a need for the coordination between a SSPC trip curve and the secondary protection mechanism. The secondary protection mechanism only needs to be sized according to the current rating of the clamp 68 and its associated power trace in the clamping path, and as a result unnecessary voltage drop across the fusible link 70 may be minimized.

Similarly to the type 1 SSPC 26, the type 2 SSPC 28 may include soft turn-on circuitry 59 and lightning protection.

Figure 7:
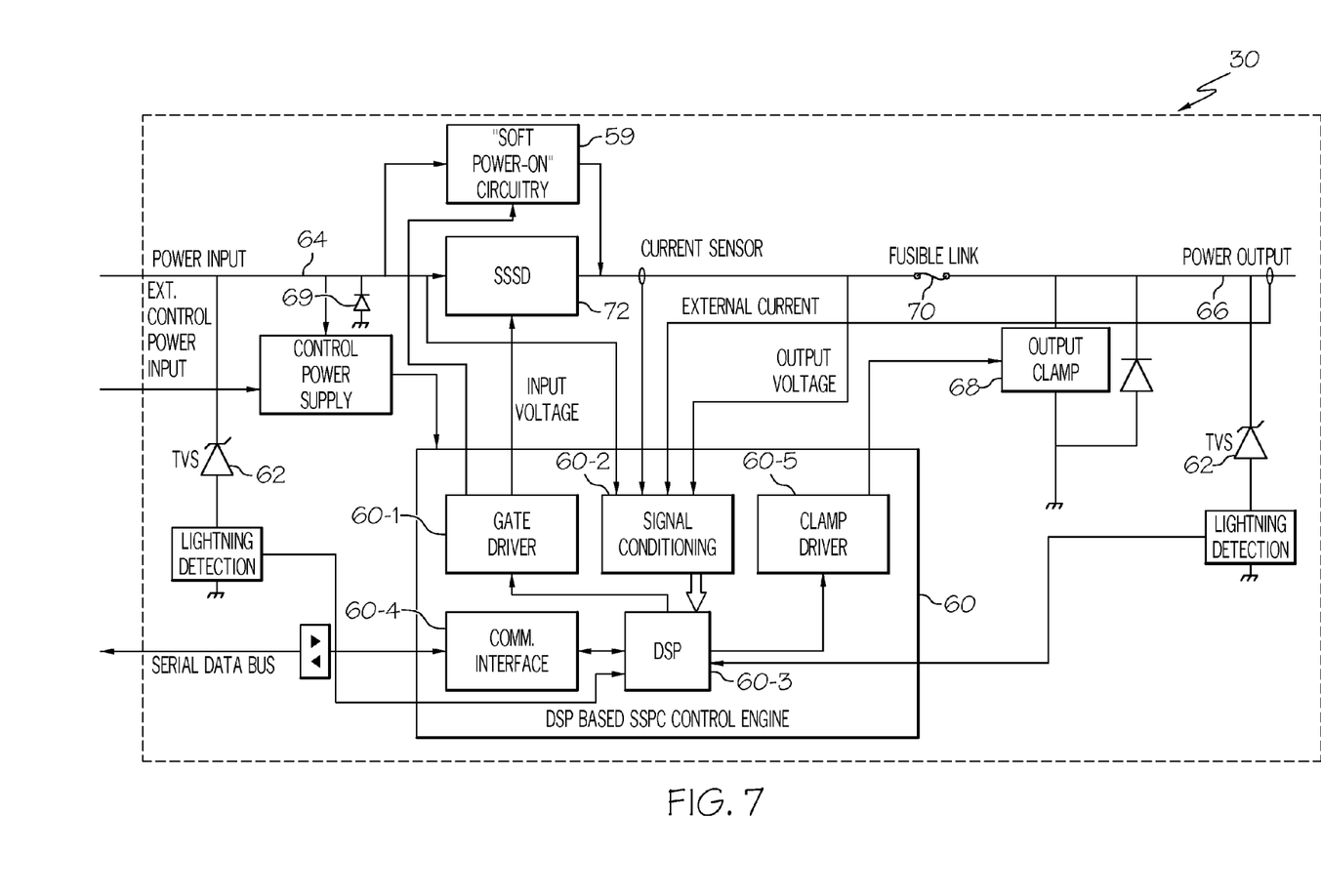
FIG. 7 is a schematic block diagram of a third type of solid state power controller (SSPC) of the EPDS of FIG. 1 in accordance with an embodiment of the invention.
Figure 8:
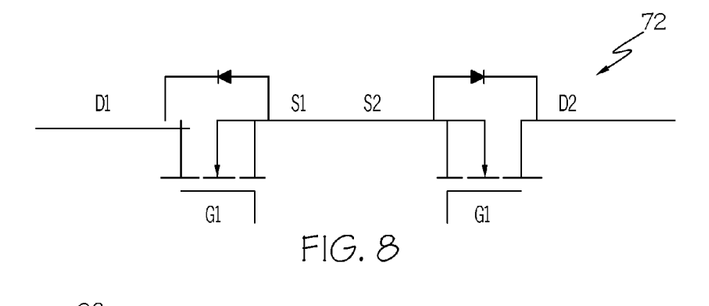
FIG. 8 is a schematic diagram of a solid state switching device (SSSD) of the SSPC of FIG. 7 in accordance with an embodiment of the invention.

Referring now to FIG. 7, one of the type 3 SSPCs 30 is illustrated in detail. In some respects the type 3 SSPC 30 may include structural and operational features which are described in the above mentioned U.S. Pat. No. 7,586,725 dated Sep. 8, 2009. The type 3 SSPC 30 may include a bidirectional SSSD 72 which may comprise multiple MOSFETs configured as shown in FIG. 8. A free-wheeling diode 69 may be provided to accommodate operation of the bidirectional SSSD 72. In all other respects, the type 3 SSPC 30 may be structurally and operationally the same as the type 2 SSPC 28.

Figure 9:
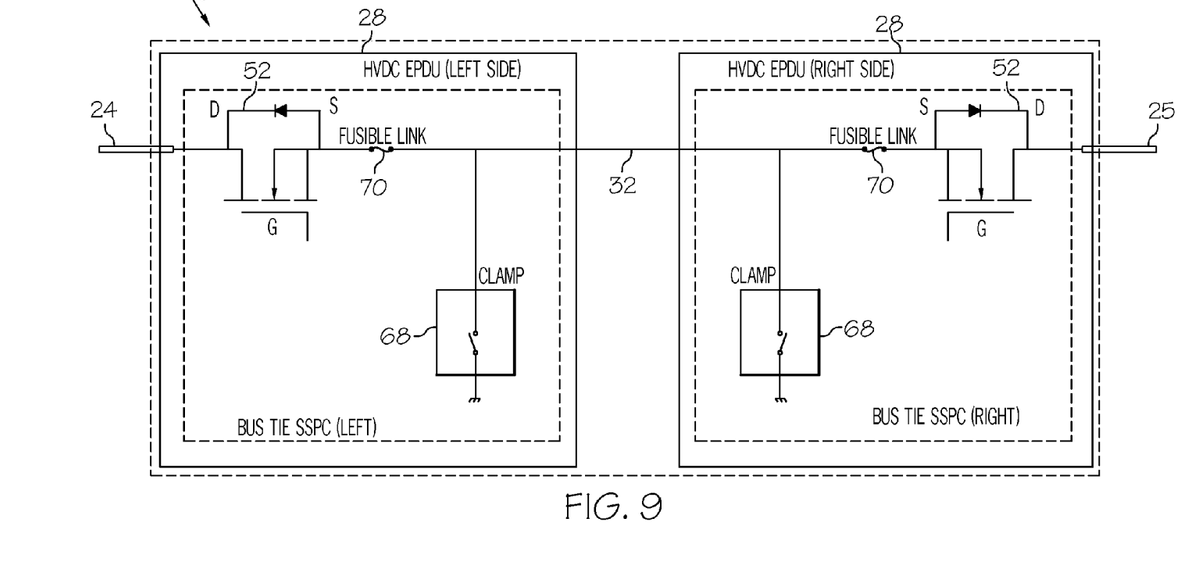
FIG. 9 is a schematic diagram of a bus tie control system in accordance with an embodiment of the invention.

Referring now to FIG. 9, there is shown a block diagram of a bus-tie control system 80 that may employ two of the type 2 SSPCs 28. Although the type 2 SSPC 28 is essentially a unidirectional switch, the reverse blocking and over current protection capability required to perform bus tie control may be achieved through proper orientation and coordinated control of two of type 2 SSPCs 28 wherein one of the SSPCs 28 may be positioned at ends of buses 24 and 25. As a result of this arrangement, the two type 2 SSPCs 28 located at the both sides of the bus tie 32 may effectively form a complimentary bidirectional switch with fusible links 70 and clamps 68 providing fail-safe measures for each of the type 2 SSPCs 28.

When the bus tie 32 needs to be connected, both of the type 2 SSPCs may be turned on. When the bus tie 32 needs to be separated, both of the type 2 SSPCs 28 may be turned off. In a case of either of the type 2 SSPCs, for example the SSPC connected to the bus 24 on a first side of the bus tie 32, detecting an over current or a differential current fault, the detecting SSPC 28 may inform the external controller 34 of FIG. 1 to turn off the SSPC 28 that is connected to the bus 25 on a second side side of the bus tie 32. If one of the SSPCs 28 fails shorted and needs to be turned off, its associated clamp 68 may force its corresponding fusible link 70 to blow, which may effectively separate the bus tie 32. Such control scenarios may be produced by the external controller 34 through the external serial data bus 42.

Figure 10:
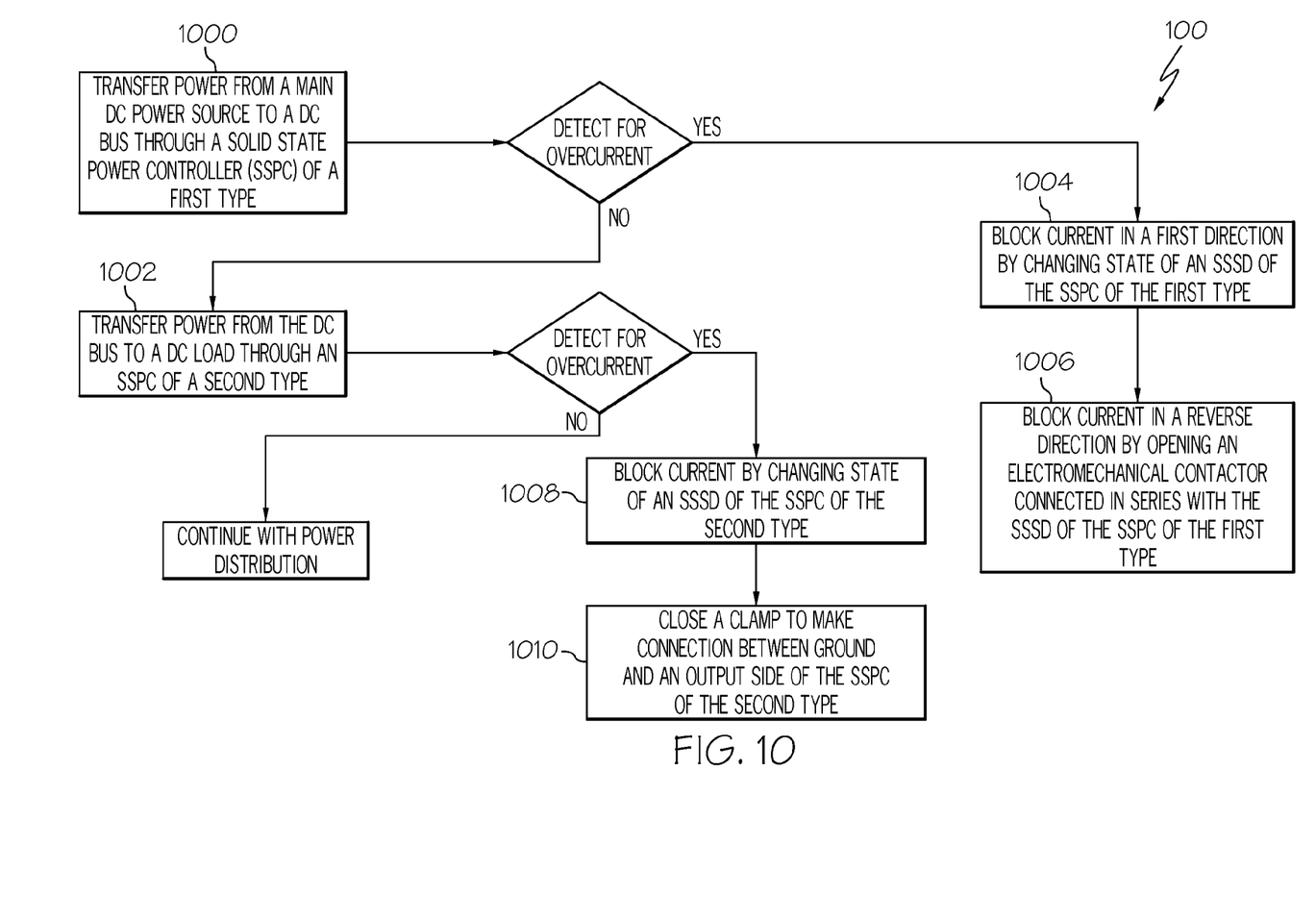
FIG. 10 is a flow chart of a method for distributing electrical power in an aircraft in accordance with an embodiment of the invention.

Referring now to FIG. 10, a flow chart may illustrate an exemplary method 100 which may be employed to distribute electrical power on an aircraft. In a step 1000 power may be transferred from a main DC power source to a DC bus through a solid state power controller (SSPC) of a first type (e.g., power may pass from the main power source 12, through one of the type 1 SSPCs 26 to the bus 24). In step 1002, power may be transferred from the DC bus to a DC load through an SSPC of a second type (e.g., power may pass from the bus 24 through one of the type 2 SSPCs 28 to the load 20). In a step 1004 current may be blocked in a first direction through the SSPC of the first type in the event of an overcurrent condition in a current path of the SSPC of the first type through operation of a unidirectional SSSD of the SSPC of the first type (e.g., the SSSD 52 of the SSPC 26 may change state and thereby block current). In a step 1006 current may be blocked in a reverse direction, opposite the first direction, through the SSPC of the first type in the event of the overcurrent condition in the current path of the SSPC of the first type by opening an electromechanical contactor connected in series with the unidirectional SSSD of the SSPC of the first type (e.g., the contactor 58 may be opened through commands from the coil driver 50-5 of the control engine 50 of the SSPC 26). In a step 1008 current may be blocked through the SSPC of the second type in the event of an overcurrent condition in a current path of the SSPC of the second type through operation of a unidirectional SSSD of the SSPC of the second type (e.g., the SSSD 52 of the SSPC may change state and thereby block current). In a step 1010 a clamping switch may be closed to produce a connection between ground and an output side of the unidirectional SSSD of the SSPC of the second type whenever the SSPC of the second type is in a current blocking state (e.g., the clamp 68 may be closed responsively to the clamp driver 60-5 of the control engine 60 of the SSPC 28).

It should be understood, of course, that the foregoing relates to exemplary embodiments of the invention and that modifications may be made without departing from the spirit and scope of the invention as set forth in the following claims.

We claim:

1. An electrical power distribution system (EPDS) for an aircraft, the EPDS comprising:
   a DC bus;
   a power source port;
   a solid state power controller (SSPC) of a first type interposed between the power source port and the DC bus;
   a load port; and
   an SSPC of a second type interposed between the load port and the DC bus;
   wherein a power input to the SSPC of the first type is connected to a first unidirectional solid state switching device (SSSD), and the SSPC of the first type has forward and reverse current conducting capability and forward and reverse current blocking capability;
   wherein a power input to the SSPC of the second type is connected to a second unidirectional SSSD, and the SSPC of the second type has forward and reverse current conducting capability and unidirectional current blocking capability; and
   wherein the SSPC of the first type includes;
   a de-rated electromechanical contactor with contacts connected in series with the first SSSD between the first SSSD and the DC bus; and
   a coil driver for opening the electromechanical contactor responsively only to an over-current condition on the DC bus or a short circuit failure of the first SSSD so that the first SSSD and the electromechanical contactor collectively provide the forward and reverse current blocking capability of the SSPC of the first type.

2. The EPDS of claim 1 further comprising:
   at least a second load port connected to a regenerative DC load;
   an SSPC of a third type interposed between the second load port and the DC bus;
   wherein power input to the SSPC of the third type is connected to a bidirectional SSSD.

3. The EPDS of claim 1 wherein the SSPC of the second type includes a clamp interposed between ground and a power output of the SSSD of the SSPC of the second type.

4. The EPDS of claim 3 wherein the SSPC of the second type includes a fusible link interposed between the clamp and the power output of the SSSD of the SSPC of the second type.

5. The EPDS of claim 3 wherein the SSPC of the second type includes a control engine with a clamp driver connected to command operation of the clamp.

6. The EPDS of claim 1 wherein the SSPC of the first type includes soft power-on circuitry.

7. A bus tie control system for an aircraft comprising:
   a first solid state power controller (SSPC) interposed between a first DC bus and a bus tie;
   a second SSPC interposed between a second DC bus and the bus tie;
   the first SSPC having a first unidirectional solid state switching device (SSSD) oriented to block current in a first direction;
   the second SSPC having a second unidirectional SSSD oriented to block current in a second direction opposite to the first direction; and
   the first SSPC and the second SSPC each include electromechanical-relay clamps,
   wherein the electromechanical-relay clamps are interposed between a ground connection and the bus tie so that, upon opening of at least the first SSSD or the second SSSD, leakage current through the bus tie is drained to ground.

8. The bus tie control system unit of claim 7 wherein the first SSSD is oriented in a first direction and the second SSSD is oriented in a second direction opposite the first direction so that the first SSSD can block current from the second bus and the second SSSD can block current from the first bus.

9. The bus tie control system of claim 7 wherein the first and second SSPCs include fusible links interposed between their respective clamps and power outputs of their respective SSSDs.

10. The bus tie control system of claim 7 wherein each of the SSPCs includes a control engine with a clamp driver connected to command operation of the clamp.

11. The bus tie control system of claim 7 wherein each of the SSPCs has forward and reverse current conducting capability and capability of blocking current from only one direction.

12. A method distributing DC power on an aircraft comprising the steps of:
   transferring power from a main DC power source to a DC bus through a solid state power controller (SSPC) of a first type;
   transferring power from the DC bus to a DC load through an SSPC of a second type;
   operating a unidirectional SSSD of the SSPC of the first type to block current passing, in a first direction, through the SSPC of the first type in the event of an overcurrent condition in a current path of the SSPC of the first type;

blocking current passing through the SSPC of the first type in a reverse direction, opposite the first direction, in the event of the overcurrent condition in the current path of the SSPC of the first type, by opening an electromechanical contactor connected in series with the unidirectional SSSD of the SSPC of the first type;

blocking current passing through the SSPC of the second type in the event of an overcurrent condition in a current path of the SSPC of the second type through operation of a unidirectional SSSD of the SSPC of the second type;

closing an electromechanical-relay clamp to produce a connection between ground and power output of the unidirectional SSSD of the SSPC of the second type whenever the SSPC of the second type is in a current blocking state so that leakage current is drained to ground.

13. The method of distributing DC power of claim 12 further comprising the steps of transferring power from the DC bus to a regenerative DC load through an SSPC of a third type;

blocking current through the SSPC of the third type in the event of an overcurrent condition in a current path of the SSPC of the third type through operation of a bidirectional SSSD of the SSPC of the third type.

14. The method of distributing DC power of claim 13 further comprising closing a clamp to produce a connection between ground and an output side of the bidirectional SSSD of the SSPC of the third type whenever the SSPC of the third type is in a current blocking state.

15. The method of claim 12 further comprising performing fault related disconnection of buses at a bus tie in accordance with the steps of:

detecting a fault condition on a first one of the buses connected to the bus tie through a first SSPC of the second type;

turning off a second SSPC of the second type that is connected to a second one of the buses connected at the bus tie in the event that the fault condition is overcurrent in the first bus; and closing a clamp to produce a connection between ground and an output side of the unidirectional SSSD of the second SSPC of the second type whenever the second SSPC of the second type is in a current blocking state.

16. The method of claim 15 further comprising closing the clamp in the first or second SSPC of the second type in the event of a short failure of the respective SSPC so that a fusible link connected to an output of the respective SSSD is connected to ground and is thereby blown.

17. The method of claim 12 comprising the step of commanding operation of a coil of the electromechanical contactor with a coil driver of a control engine of the SSPC of the first type.

18. The method of claim 12 comprising the step of commanding operation of the clamping switch with a clamp driver of a control engine of the SSPC of the second type.

* * * * *